(12) United States Patent
Rinke

(10) Patent No.: US 6,746,200 B1
(45) Date of Patent: Jun. 8, 2004

(54) AUXILIARY VEHICLE TRANSPORTER

(76) Inventor: Daniel Gerald Rinke, 19845 Stafford, Clinton Township, MI (US) 48035

( * ) Notice: Subject to any disclaimer, the term of this patent is extended or adjusted under 35 U.S.C. 154(b) by 174 days.

(21) Appl. No.: 10/041,257

(22) Filed: Jan. 8, 2002

(51) Int. Cl.$^7$ ................................................. B60P 1/00
(52) U.S. Cl. ........................................ 414/545; 414/469
(58) Field of Search ................................. 414/229, 354, 414/360, 371, 462, 537, 545, 549, 540, 557, 541

(56) References Cited

U.S. PATENT DOCUMENTS

| | | | |
|---|---|---|---|
| 3,747,782 A | | 7/1973 | Brown |
| 3,791,541 A | | 2/1974 | Himes |
| 3,794,227 A | | 2/1974 | Stearns |
| 3,831,788 A | | 8/1974 | Erlinder |
| 3,877,590 A | | 4/1975 | Brown |
| 3,892,088 A | * | 7/1975 | Fleenor ........................ 49/37 |
| 4,007,844 A | | 2/1977 | Perkins |
| 4,087,007 A | | 5/1978 | Drews |
| 4,455,119 A | * | 6/1984 | Smith ........................ 414/537 |
| 4,540,329 A | | 9/1985 | Martin |
| 4,576,541 A | | 3/1986 | Dunn et al. |
| 4,646,952 A | | 3/1987 | Timmers |
| 4,930,969 A | | 6/1990 | Langer |
| 4,930,971 A | | 6/1990 | Wilson |
| 4,950,010 A | | 8/1990 | Denny |
| 5,011,361 A | * | 4/1991 | Peterson ...................... 414/462 |
| 5,176,486 A | | 1/1993 | Park |
| 5,427,289 A | * | 6/1995 | Ostor .......................... 224/499 |
| 5,456,564 A | * | 10/1995 | Bianchini ................... 414/462 |
| 6,361,264 B1 | * | 3/2002 | Guthrie et al. .............. 414/462 |
| 6,579,055 B1 | * | 6/2003 | Williams ..................... 414/462 |
| 6,599,078 B1 | * | 7/2003 | Elder .......................... 414/542 |

OTHER PUBLICATIONS

Waltco Truck Equipment Co Lift Gate Catalog of Waltco Truck Equipment Co., Tallmadge, OH 44278; Dated 2001.

* cited by examiner

*Primary Examiner*—Eileen D. Lillis
*Assistant Examiner*—Charles A. Fox
(74) *Attorney, Agent, or Firm*—Peter D. Keefe

(57) ABSTRACT

An auxiliary vehicle transporter for a master vehicle which has a platform that reverse articulates and is removably connected thereto. The auxiliary vehicle transporter includes a main frame, a platform pivotally connected to the main frame for supporting an auxiliary vehicle, a reverse articulation apparatus for reverse folding the platform with respect to the main frame, and a frame connection group for removably connecting the main frame to a hitch and the vehicular frame of a master vehicle without inflicting injury to the vehicular frame.

17 Claims, 8 Drawing Sheets

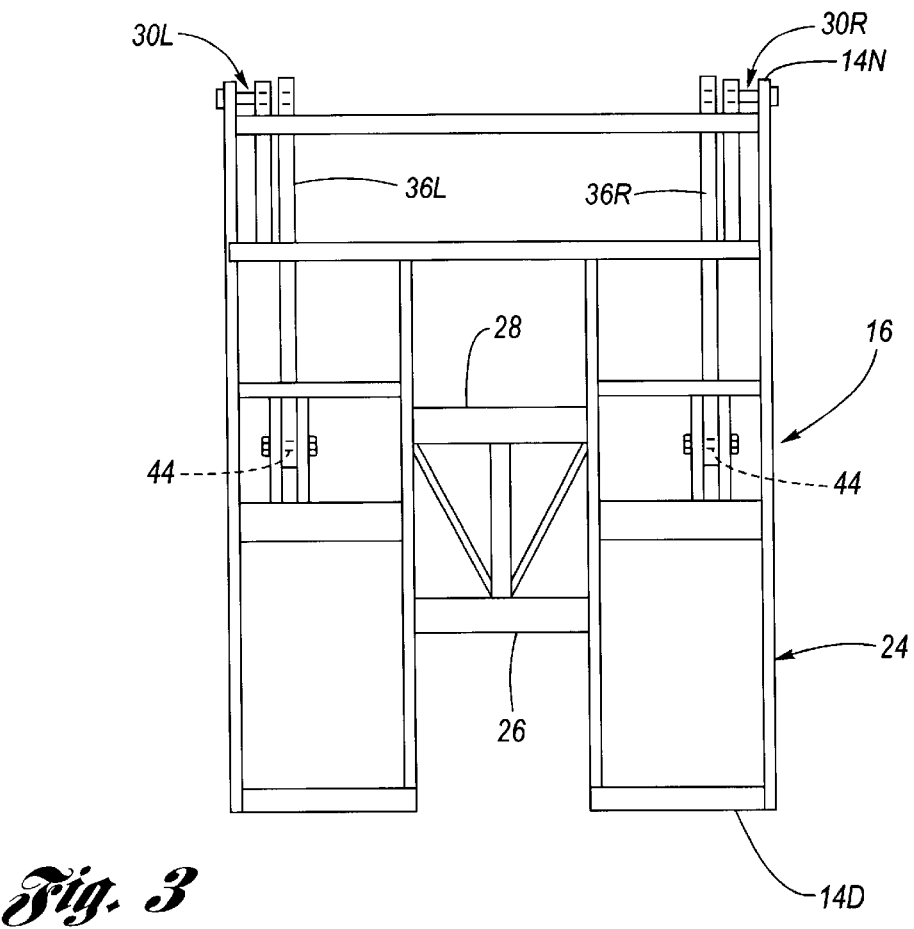
Fig. 3
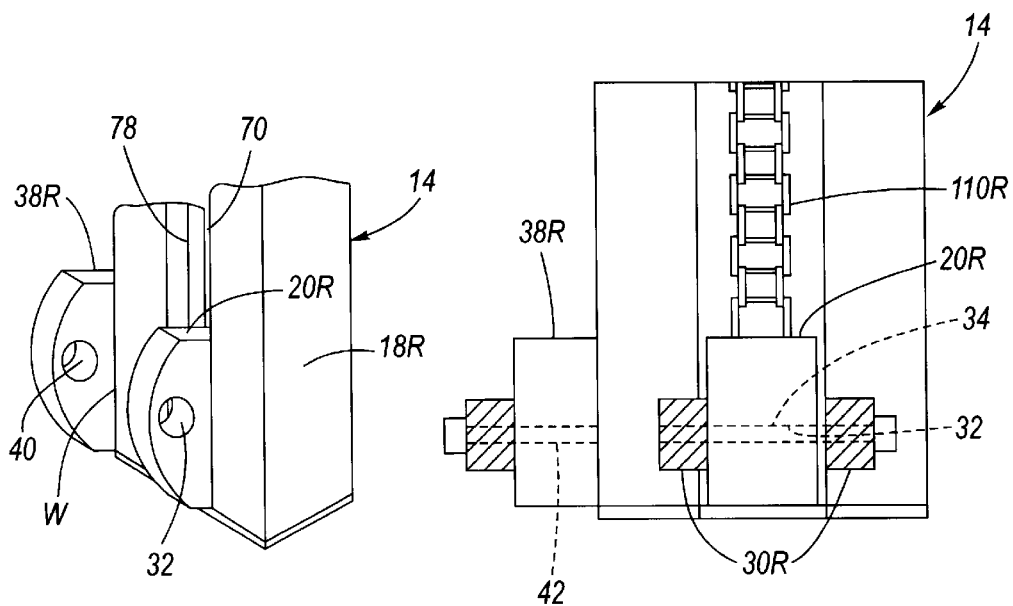
Fig. 4
Fig. 5

US 6,746,200 B1

AUXILIARY VEHICLE TRANSPORTER

BACKGROUND OF THE INVENTION

1. Field of the Invention

The present invention relates to master vehicles (for example a motor home or a travel trailer), and more particularly to an auxiliary vehicle transporter connected to a master vehicle for providing transportation therewith of an auxiliary vehicle.

2. Description of the Prior Art

Master vehicles, as for an unlimiting example, motor homes (also referred to as recreation vehicles (RVs)) and travel trailers, sometimes are accompanied by an auxiliary vehicle for providing local transport. Auxiliary vehicles may take many different forms, but unlimiting examples include electric powered commuter vehicles, golf carts, all terrain vehicles (ATVs), motor cycles, scooters and powered wheel chairs. In the art, auxiliary vehicles accompany master vehicles by provision of a trailer, a rear extension or an interior intrusion. In the case of a trailer, problems attendant to lighting, license plating and driving technique make this an undesirable provision modality. In the case of a rear extension, the master vehicle can only accommodate a short overhang which likely can only allow for auxiliary vehicles of narrow and small size (ie., a scooter), but cannot allow for larger auxiliary vehicles (ie., ATVs and golf carts, and commuter vehicles). Providing a space for transport of an auxiliary vehicle by intruding into the occupant space of a master vehicle is a solution that detracts from the serviceability of the master vehicle. Accordingly some new solution is a serious need yet felt in the art.

SUMMARY OF THE INVENTION

The present invention is an auxiliary vehicle transporter for a master vehicle which reverse articulates and is removably connected thereto.

The auxiliary vehicle transporter includes a main frame, a platform pivotally connected to the main frame for supporting an auxiliary vehicle, a reverse articulation apparatus for reverse folding the platform with respect to the main frame, and a frame connection group for removably connecting the main frame to a hitch and the vehicular frame of a master vehicle without inflicting injury to the vehicular frame.

The platform is a rigid structure suitably configured for supporting a predetermined range of auxiliary vehicles. The main frame includes a pair of lift rails; a lift eye actuation assembly for slidably moving a lift eye in each lift rail, wherein a near end of the platform is pivotally connected to the lift eyes; and a pair of pivot arms, each pivotally connected at one end to a medial location of the platform and at the other end to the main frame.

In operation, the main frame is first removably connected, via the connection group, to the (Class III or above rated) hitch of a selected master vehicle, and then removably connected to the vehicular frame of the master vehicle via the connection group. With the platform at its deployed position, the distal end of the platform rests upon the driving surface (for example, a road or driveway surface), and a selected auxiliary vehicle is placed upon the platform and secured thereto. The user then activates the reverse articulation apparatus, wherein the lift eye actuation assembly causes the lift eyes to slide upwardly along the lift rails. As the near end of the platform is drawn upwardly by the lift eyes, the platform is caused to reverse articulate in the sense that the platform articulates such that the upper surface of the platform comes into parallel with the lift rails as the lift eyes ascend the lift rails. Upon completion of the eyelet movement, the platform is locked into a support position on the main frame, whereupon the auxiliary vehicle is stored in a vertical attitude rearwardly of the master vehicle. Reactivation of the reverse articulation apparatus results in the lift eye actuation assembly releasing the support position and a subsequent reverse motion of the lift eyes along the lift rails to the lowermost position. As the lift eyes descend, the platform retraces the reverse articulation so that the platform resumes the original attitude with the distal end on the driving surface when the lift eyes are fully descended.

Accordingly, it is an object of the present invention to provide a reverse articulating platform assembly.

It is an additional object of the present invention to provide an auxiliary vehicle transporter which provides support of an auxiliary vehicle with a reverse articulation movement.

It is another object of the present invention to provide an auxiliary vehicle transporter which provides support of an auxiliary vehicle with a reverse articulation movement, wherein the auxiliary vehicle transporter is connected to the master vehicle in a non-injurious manner.

These, and additional objects, advantages, features and benefits of the present invention will become apparent from the following specification.

BRIEF DESCRIPTION OF THE DRAWINGS

FIG. 3 is a top plan view of the framework of the platform.

FIG. 4 is a broken-away, detail perspective view of a lower end of a lift rail of the auxiliary vehicle transporter according to the present invention.

FIG. 5 is a broken away, detail front view of a lift rail of the auxiliary vehicle transporter according to the present invention, showing interconnections of a pivot arm and platform pivot connection.

FIGS. 14A and 14B are partly sectional side views of either of the lift rails of the auxiliary vehicle transporter according to the present invention, showing a lift eye actuation assembly thereof, wherein FIG. 14A depicts the configuration thereof when the platform is at its deployed position, and wherein FIG. 14B depicts the configuration thereof when the platform is at its stored position.

FIGS. 16 and 17 are operational views as in FIG. 8, wherein, FIG. 16 depicts the platform at an intermediate position between its deployed and stored positions, and wherein FIG. 17 shows the platform at its stored position.

DETAILED DESCRIPTION OF THE PREFERRED EMBODIMENT

Figure 1:
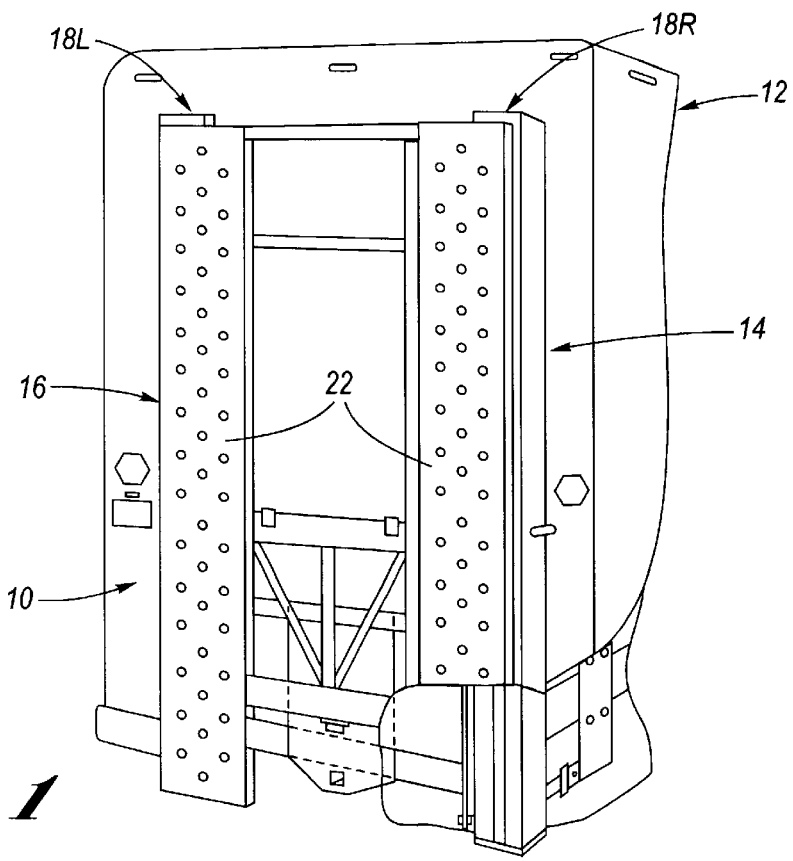
FIG. 1 is a broken-away perspective view of a motor home equipped with an auxiliary vehicle transporter according to the present invention, wherein a platform thereof is shown at its stored position.
Figure 2:
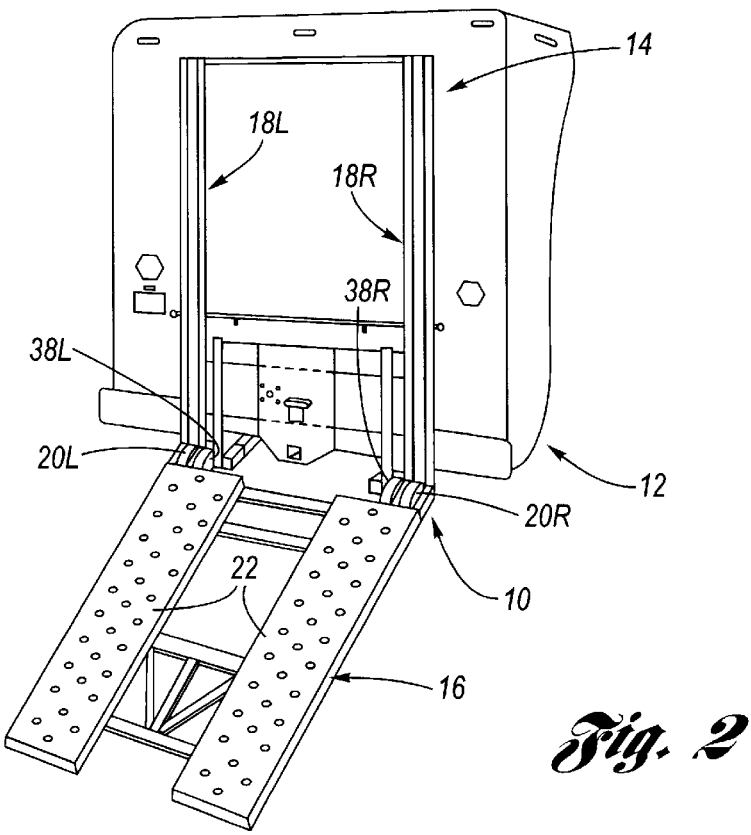
FIG. 2 is a broken-away perspective view of a motor home equipped with an auxiliary vehicle transporter according to the present invention, wherein the platform is shown at its deployed position.

Referring now to the Drawing, FIGS. 1 and 2 depict the auxiliary vehicle transporter 10 connected (preferably in a non-injurious and removable manner as described hereinbelow) to a master vehicle (wherein this term refers to any master vehicle, including a motor home (RV), travel trailer, etc.) 12. The auxiliary vehicle transporter 10 includes a main frame 14, and a platform 16 which is pivotally connected to the main frame. The main frame 14 has a pair of mutually spaced apart lift rails 18L, 18R and lift eyes 20L, 20R slidably movable along each of the lift rails, respectively. As shown at FIG. 2, the platform 16 includes a transport surface 22 upon which an auxiliary vehicle 24 is placed (see FIG. 8). The auxiliary vehicle transporter 10 includes within the main frame 14 a lift eye actuation assembly 25 (see FIGS. 14A and 14B).

As can be understood by simultaneous reference to FIGS. 1 and 2, the platform 16 is movable by operation of the lift eye actuation assembly 25 between a stored position shown at FIG. 1 and a deployed position shown at FIG. 2. In this regard, since the platform 16 is pivotally connected to the lift eyes 20L, 20R, as the lift eye actuation assembly 25 raises or lowers the lift eyes along the lift rails 18L, 18R, always the transport surface 22 is freely exposed. This movement, which moves the transport surface 22 away from the rear of the master vehicle at the stored position, is a "reverse articulation" movement when compared with the movement of a conventional lift-gate. In this regard, a conventional lift gate moves up and down while the transport surface is kept horizontal and then moves the transport surface in a "forward articulation" toward the rear gate of the vehicle so as to attain a stored position. The components which provide reverse articulation of the platform (ie., the platform pivoting system, the lift eyes and lift rails and the lift eye actuation assembly) are referred to collectively as a reverse articulation apparatus.

The structural and functional aspects of the auxiliary vehicle transporter 10 will be further elaborated with additional reference to the remaining figures. FIG. 3 depicts the platform 16, wherein the transport surface 22 is removed to show the platform framework 24. The platform framework 24 includes a transverse resting bar 26 and a transverse securement bar 28, both of which will be referred to functionally hereinbelow. At the near end 14N of the platform 16 is a platform pivot 30L, 30R, each preferably in the form of a clevis, having a pivot hole 32 formed therein for receiving a pivot pin 34 therethrough (see FIG. 5). As can be understood by reference to FIGS. 4 and 5, a lift eye 20L, 20R is respectively received by each platform pivot 30L, 30R, whereby the pivot pin 34 respectively thereof pivotally conjoins the platform 16 to the main frame 14.

A pair of pivot arms 36L, 36R are pivotally connected to the main frame 14 and pivotally connected to a medial location of the platform. In this regard, as shown at FIGS. 4 and 5, an arm eyelet 38L, 38R is provided for each pivot arm 36L, 36R, wherein the arm eyelets are affixed, such as by welding W, to the main frame 14 so that the pivot hole 40 thereof which receives a pivot pin 42 for pivoting the pivot arm is horizontally aligned with the pivot holes 32 of the lift eyes 20L, 20R when the lift eyes are at the lowermost position along the lift rails. The other end of each of the pivot arms 36L, 36R is pivotally connected, respectively, by a pivot pin 44 to a medial (preferably at the lengthwise mid-point) location of the platform framework 24.

The materials of the platform 16 are selected for rigidity, durability and corrosion resistance, and may be a combination of metals (ie., aluminum and steel) and plastics. Each pivot pin 34, 42, 44 is constructed suitably, as for example in the form of a smooth shanked, cotter pinned, flat headed pin or a threadably secured bolt.

Figure 6A:
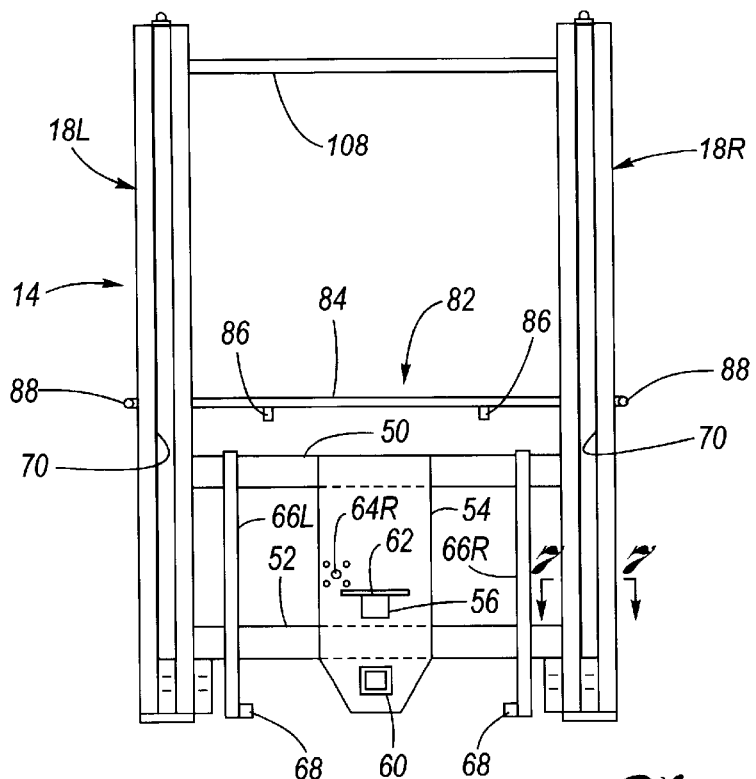
FIG. 6A is a front view of a main frame of the auxiliary vehicle transporter according to the present invention.
Figure 6B:
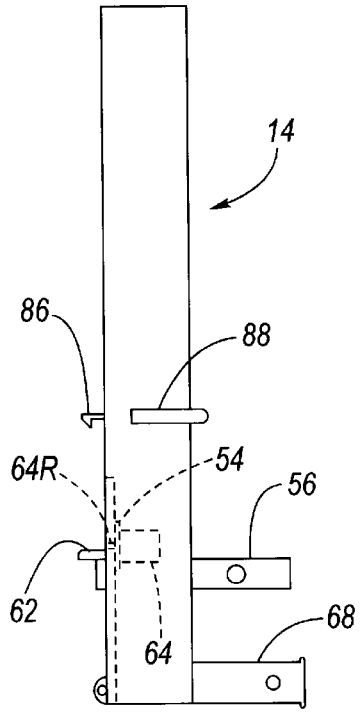
FIG. 6B is a side view of the main frame of the auxiliary vehicle transporter according to the present invention.

Turning attention now to the main frame 14, as shown at FIGS. 6A and 6B the main frame 14 includes the aforementioned left and right lift rails 18L, 18R which are interconnected, as for example by welding, via first and second cross beams 50, 52. A main plate 54 is connected (as for example by welding) to the first and second cross-beams 50, 52.

Figure 8:
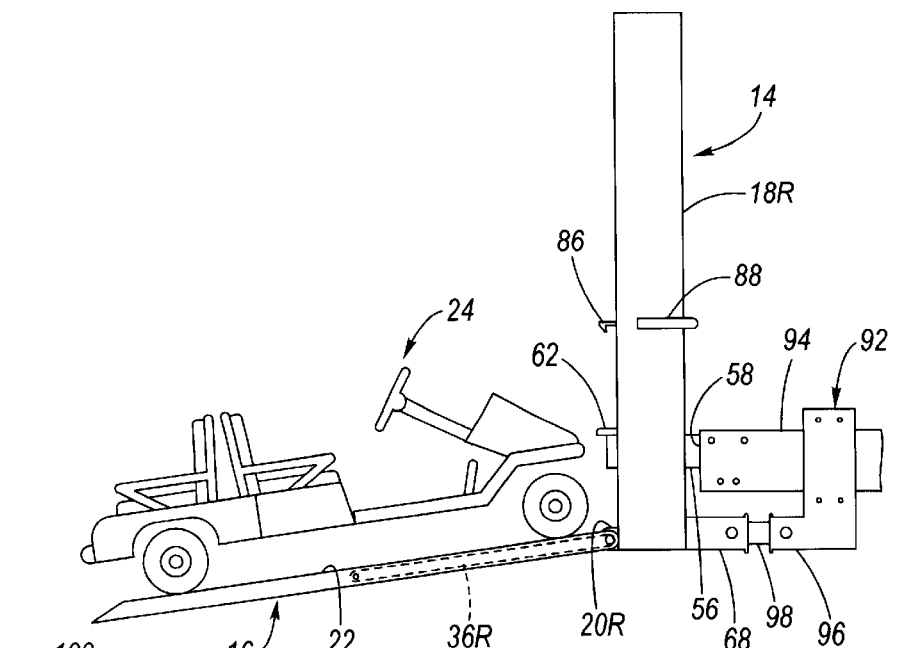
FIG. 8 is a side view of the auxiliary vehicle transporter according to the present invention, shown in operation with respect to the vehicular frame of a master vehicle and an auxiliary vehicle, wherein the platform is shown at its deployed position.

The main plate 54 has a rearwardly projecting hitch insert 56 which is dimensioned to properly fit into a standard hitch 58 (Class III or above rated hitch) of the master vehicle 12 (see generally FIG. 8). The main plate 54 further includes a (Class III or above rated) hitch 60 so that trailers, etc. may still be towed by the master vehicle 12 even though its hitch 58 is occupied by the hitch insert 56. The main plate 54 has a forwardly projecting ledge 62 upon which the resting bar 26 of the platform rests when the platform is in the stored position of FIGS. 1 and 12. Connected to the main plate 54 is a kick-out cylinder 64 having a cylinder rod 64R which is passable forwardly in relation to the main plate via an aperture formed therein.

Attachment bars 66L, 66R are attached (preferably by welding) to the first and second cross-beams 50, 52 (see the methodology described hereinbelow). At a lower end of each of the attachment bars 66L, 66R is (via for example welding) a respective a first receiver tube (preferably of square cross-section) 68.

Each of the lift rails 18L, 18R is constructed as a hollow channel 72, having a forward slot 70 extending lengthwise therealong. The channel 72 is divided into a forward chamber 74 and a rearward chamber 76 lengthwise of the lift rails 18L, 18R. The forward chamber 74 includes the aforementioned slot 70, and further includes a slide seat 78. The slide seat 78 is composed of a wear resistant, rigid, and low friction material, as for example TEFLON. Into each slide seat 78 is slidably seated a respective lift eye, 20L, 20R. In this regard each lift eye 20L, 20R has a rectangular base 20B which is slidably seated in the slide seat 78 and further has an integral eyelet member 20E which projects outwardly from the slot 70. The aforementioned lift eye actuation assembly 25 has a hydraulic cylinder 80L, 80R in each of the rearward chambers 76.

Figure 12:
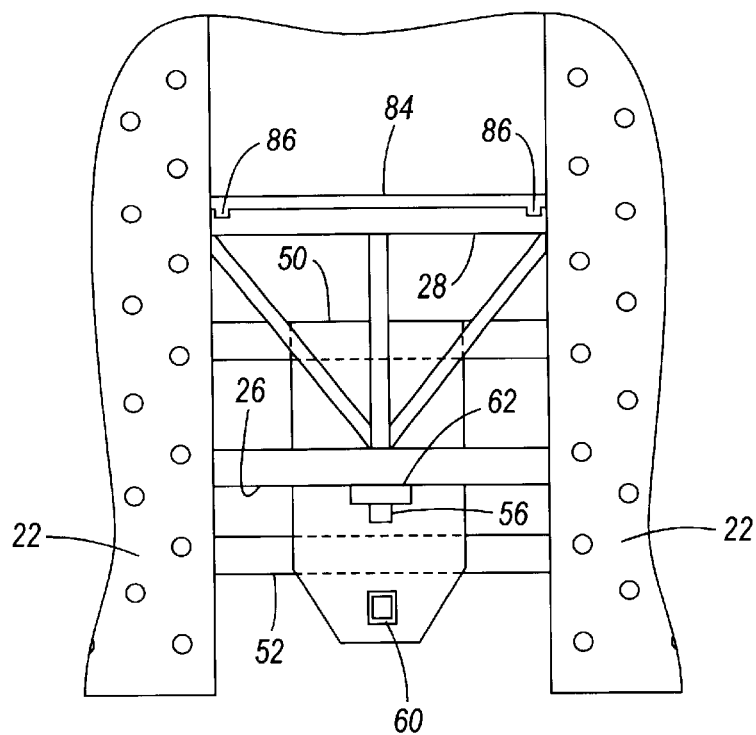
FIG. 12 is a broken-away, frontal view of the auxiliary vehicle transporter according to the present invention, shown with the platform at its stored position.
Figure 13:
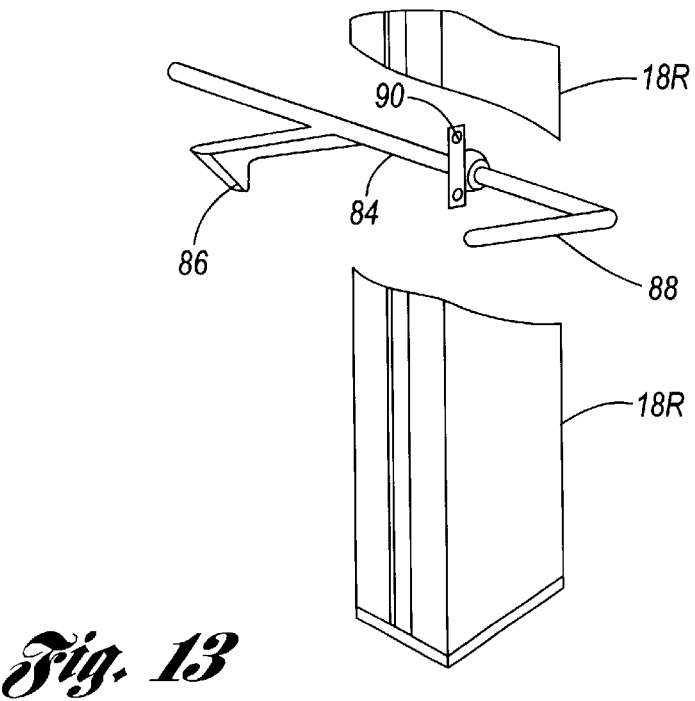
FIG. 13 is a broke-away, exploded, perspective view of a latch rod of the auxiliary vehicle transporter according to the present invention.

A safety latch system 82 includes a latch rod 84, a pair of latch fingers 86 and latch release handles 88 (see also FIG. 13). The latch rod 84 is rotatively connected to the lift rails 18L, 18R by mounting brackets 90. In operation, when the platform assumes its storage position, as shown at FIGS. 1 and 12, the latch fingers grab the securement bar 28 by automatic action of a spring or by gravity. Before the platform can again be moved to the deployed position of FIG. 2, either latch release handle 88 is used by an operator to cause the latch fingers 86 to ungrab the securement bar 28.

Figure 9:
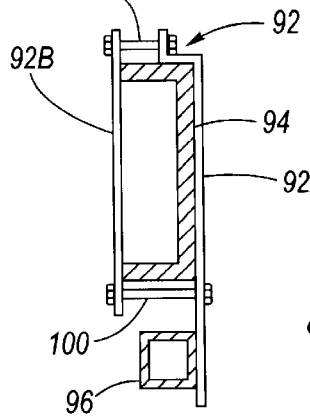
FIG. 9 is a partly sectional end view of a frame bracket of the auxiliary vehicle transporter according to the present invention shown installed on a vehicular frame of a master vehicle.
Figures 9A, 9B:
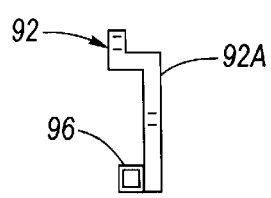
FIGS. 9A and 9B show, respectively a plan view of a frame bracket plate, and a rear view of an L-shaped frame bracket, both of which being components of the frame bracket of FIG. 9.
Figure 10A:
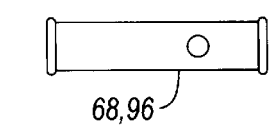
FIG. 10A is a side view of first and second receivers of the auxiliary vehicle transporter according to the present invention.
Figure 10B:
FIG. 10B is a side view of a tubular insert of the auxiliary vehicle transporter according to the present invention for being received by the first and second receivers of FIG. 10A.
Figures 11A, 11B:
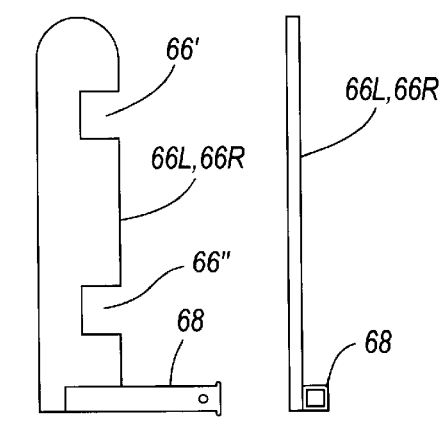
FIGS. 11A and 11B, show, respectively, side and frontal views of an attachment bar of the main frame of the auxiliary vehicle transporter according to the present invention.

The connection of the main frame 14 to a master vehicle 12 can be understood by reference to FIGS. 8 through 11B. The hitch insert 56 is inserted into the (Class III or above rated) hitch 58 of the master vehicle 12, and the pin associated with the hitch is passed therethrough to secure it thereinside. Next, a pair of frame brackets 92 are assembled over each vehicular frame member 94. In this regard, each frame bracket 92 includes an L-shaped frame bracket 92A having (attached preferably by welding) a second receiver tube 96, and further includes a frame bracket plate 92B. With respect to each frame bracket 92, the L-shaped frame bracket 92A is bolted to the frame bracket plate 92B so as to loosely engird a respective vehicular frame member 94, as shown at FIG. 9. Thereafter, the attachment bars 66L, 66R are positioned so that a tubular insert 98 is inserted into each of the first and second receiver tubes 68, 96. Pins (preferred), bolts or welding then secure the tubular inserts to their respective first and second receiver tubes. Now, with the first and second receiver tubes 68, 96 mutually aligned, the attachment bars 66L, 66R are fitted onto the first and second cross-bars 50, 52 via slots 66', 66" thereof (see FIG. 11A) and then welded thereto. Finally, the bolts 100 of the frame brackets 92 are tightened so that the frame brackets tightly engird, so as not to be slippable therealong, their respective vehicular frame members 94.

Figure 7:
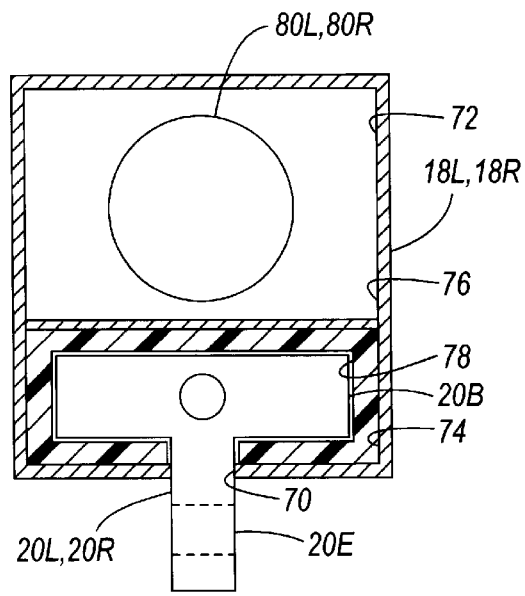
FIG. 7 is a partly sectional view, seen along line 7—7 in FIG. 6A.
Figures 14A, 14B:
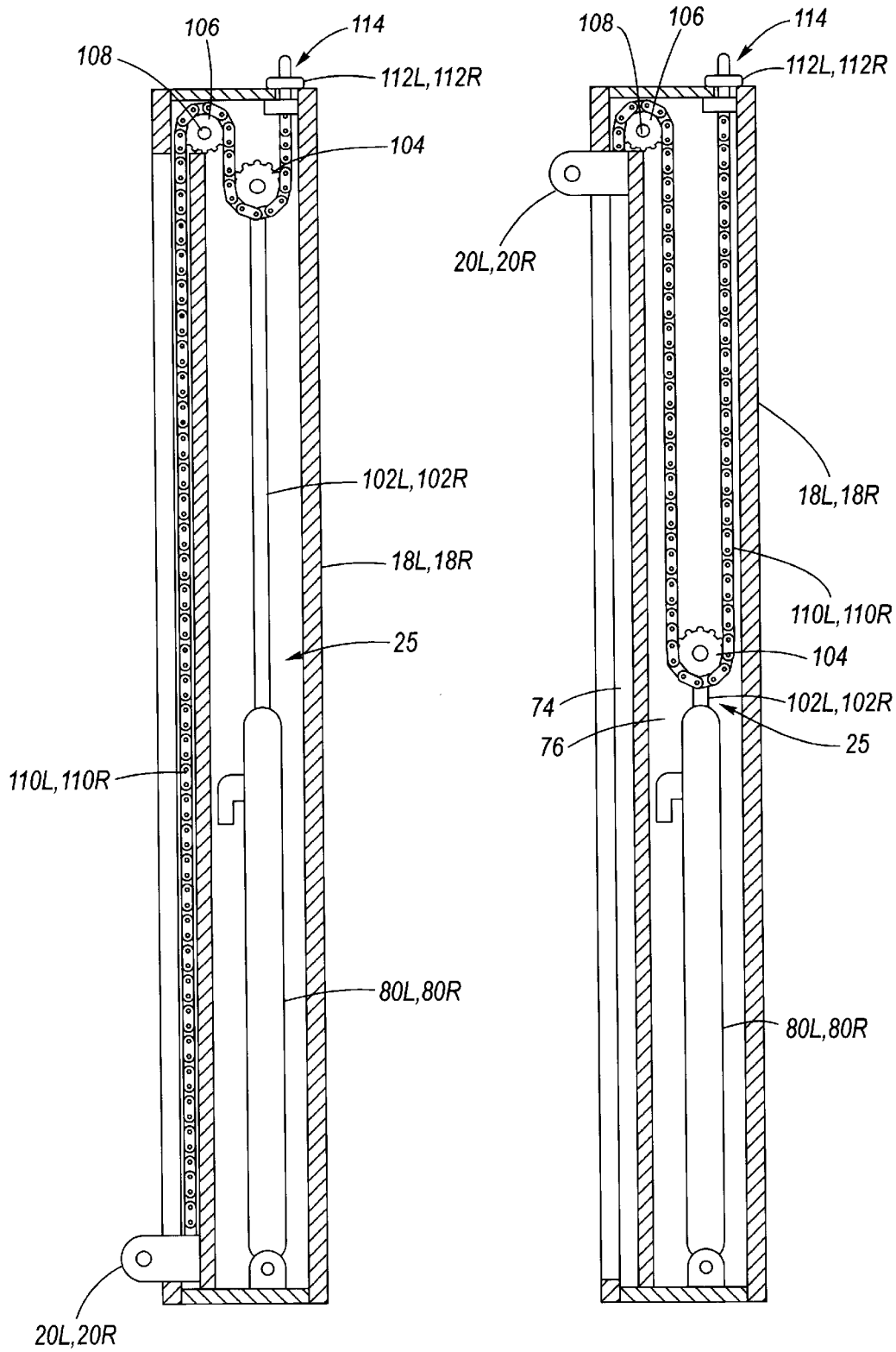

Referring now additionally to FIGS. 14A though 15 the lift eye actuation assembly 25 will be discussed. Each lift rail 18L, 18R includes an hydraulic cylinder 80L, 80R, as mentioned with regard to FIG. 7. Each hydraulic cylinder 80L, 80R has a piston rod 102L, 102R having a main sprocket 104 at its respective end. An idler sprocket 106 is located in each lift rail 18L, 18R, respectively, at an uppermost end thereof, wherein an idler sprocket rod 108 (see FIG. 6A) interconnects both of the idler sprockets so that they must rotate synchronously. A lift chain 110L, 110R is located in each lift rail 18L, 18R, having one end fixedly connected to a respective lift eye 20L, 20R, and the other end connected to a respective terminous 112L, 112R, while therebetween engageably threading on each of the main and idler sprockets 104, 106. The terminous 112L, 112R has a threaded mechanism 114 for adjusting the placement of the end of the chain 110L, 110R thereat.

FIG. 14A shows the lift eyes 20L, 20R at the lowermost position, when the platform would be at the deployed position of FIG. 2. Now, the piston rods 102L, 102R are fully extended. Activation of the hydraulic circuit 116 of FIG. 15 results in the piston rods 102L, 102R of the hydraulic cylinders 80L, 80R retracting, causing the lift eyes 20L, 20R to slide in their respective slide seats 78 upwardly along the lift rails 18L, 18R until the uppermost position is reached, as shown at FIG. 14B. Now the platform is at the stored position of FIG. 1.

Figure 15A:
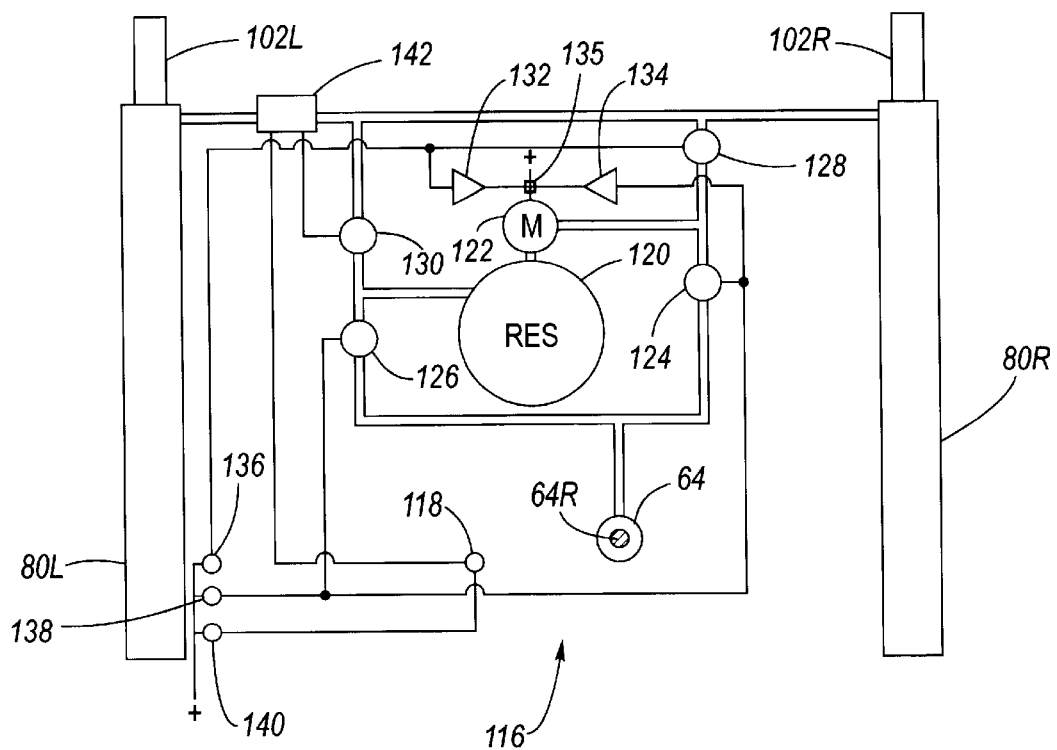
FIG. 15A is a schematic diagram of an hydraulic circuit for the lift eye actuation assembly of FIGS. 14A and 14B.

FIG. 15A is a schematic of a suitable hydraulic circuit 116 for the lift eye actuation assembly 25, wherein hydraulic lines are shown as piping and wherein electrical lines are shown as lines.

An hydraulic fluid reservoir 120 is hydraulically connected to a hydraulic pump 122, which is, in turn, hydraulically connected to a normally closed raise solenoid valve 128 and to a normally closed kick-out cylinder solenoid valve 124. The raise solenoid valve 128 is hydraulically connected to the hydraulic cylinders 80L, 80R, which are hydraulically connected on the return side to a normally closed down solenoid valve 130, which, in turn, is connected to a return of the reservoir 120. The kick-out solenoid valve 124 is hydraulically connected to the kick-out cylinder 64 and connected to a normally open pressure release solenoid valve 126, which is, in turn, connected to the return of the reservoir 120.

On the main frame, such as for example via a control panel (see 144 in FIG. 15B), are a momentary raise push button 136, a momentary kick-out push button 138 and a momentary lower push button 140. The raise push button 136 is electrically connected through a diode 132 to a solenoid switch 135 which supplies high current power to the hydraulic motor 122, and is further connected to the raise solenoid valve 128. The kick-out push button 138 is electrically connected through a diode 134 to the solenoid switch 135 which, as mentioned, supplies high current power to the hydraulic motor 122, and is further connected to the pressure release solenoid valve 126 and the kick-out solenoid valve 124, wherein the pressure release solenoid valve is only closed when the kick-out solenoid valve is open. The lower push button 140 is electrically connected to the down solenoid valve 130 through a kick-out sensor 118 and a hydraulic pressure sensor 142, both of which regulating the operative condition of the down solenoid valve. The kick-out sensor senses whether kick-out of the resting bar 26 relative to the ledge 62 has occurred; if not, the down solenoid valve cannot open. The hydraulic pressure sensor 142 senses whether there is sufficient hydraulic pressure in the hydraulic cylinders 80L, 80R to provide an acceptable rate of gravity induced descend of the platform, the rate being for example dictated by the valve and/or line sizing; if not, the down solenoid valve cannot open.

To raise the platform from the deployed position, a user presses the raise push button, whereupon the solenoid switch closes and delivers high current power to the hydraulic pump; the raise solenoid valve opens. The platform now reverse articulates to the stored position, and the resting bar rests upon the ledge and the latch fingers grab the first cross-beam. To lower the platform back to the deployed position, the user releases the latch fingers, then presses the kick-out push button to effect kick-out of the resting bar in relation to the ledge. The user then presses the lower push button which then causes the lower solenoid valve to open if both kick-out and sufficient hydraulic pressure are sensed. The platform then reverse articulates to the deployed position.

Figure 15B:
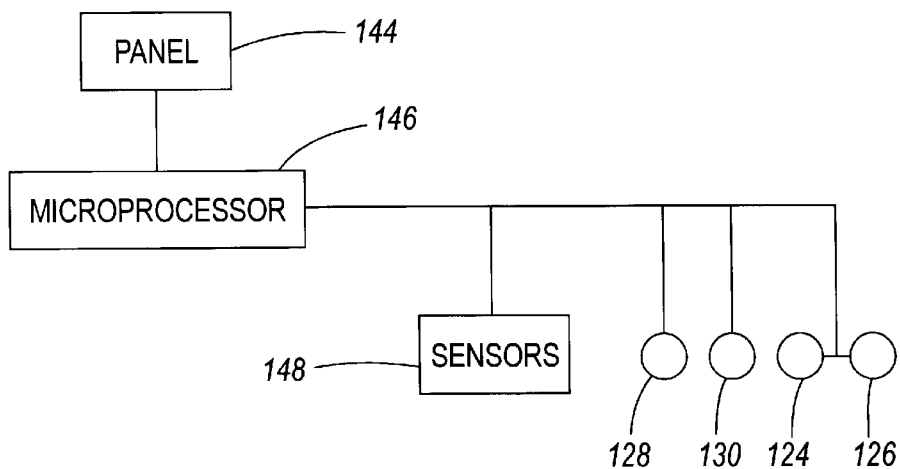
FIG. 15B is a schematic diagram of a microprocessor controlled hydraulic circuit as in FIG. 15A.

FIG. 15B is an automated version of the hydraulic circuit of FIG. 15A, wherein a microprocessor 146 takes commands from a panel 144, uses data from sensors 148, for example data regarding platform position, kick-out condition, latch finger location, and hydraulic line pressure, and then directs operative signals selectively to the solenoid valves 128, 130,124 and 126.

Figure 16:
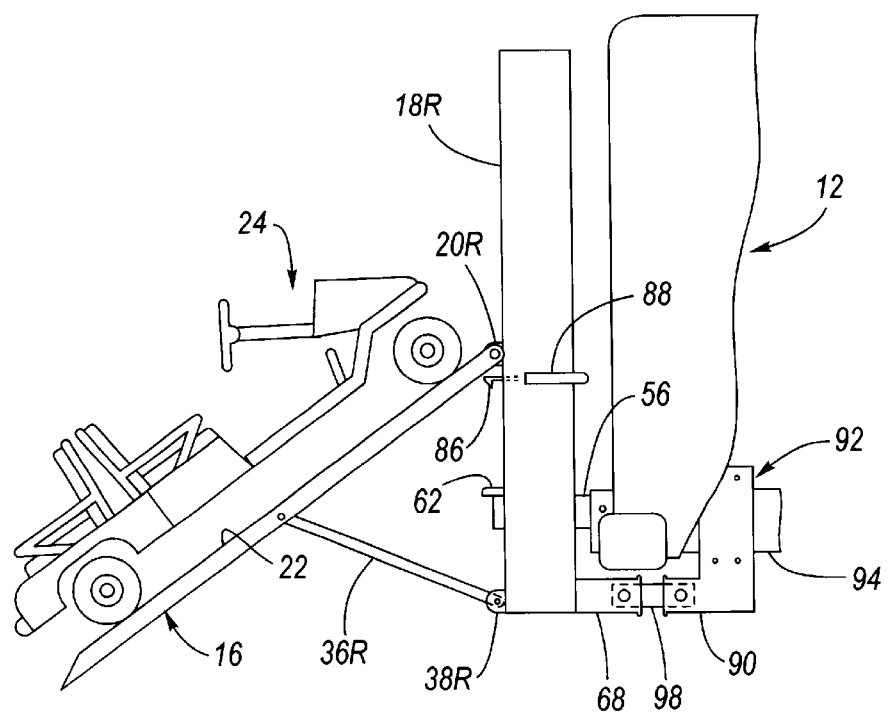
Figure 17:
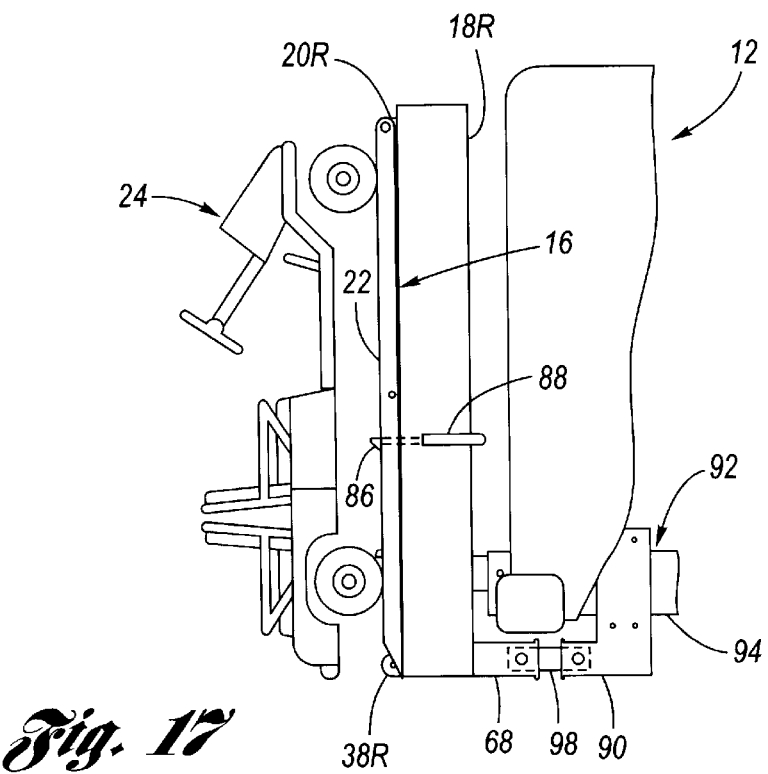

An overview of operation of the auxiliary vehicle transporter 10 can be understood by additional reference to FIGS. 16 and 17.

Beginning with the platform in the deployed position of FIG. 1, an auxiliary vehicle 24 is driven, pushed or otherwise placed upon the platform 16, as shown at FIG. 8. After securing the auxiliary vehicle to the platform by any suitable tie-down, the operator then activates the reverse articulation apparatus in storage mode. In this regard, the lift eye actuation mechanism 25 moves from the configuration of FIG. 14A to that of 14B, whereduring the platform reverse articulates from the orientation depicted at FIG. 8, through the orientation depicted at FIG. 16 to the storage position depicted at FIG. 17. Upon the platform just reaching the storage position of FIG. 17, the latch fingers 86 grab the securement bar 28 (see FIG. 12). The hydraulic circuit 116 automatically commands the lift eye actuation assembly 25 to lower the resting bar 26 restably upon the ledge 62. With the platform safe and secure at the storage position, the master vehicle 12 may now be safely operated on the roads.

Upon reaching a destination, the operator rotates the latch release handle 88 to release the latch fingers from grasping of the first cross-beam. Thereupon, the operator activates the reverse articulation apparatus into deployed mode. The lift eye actuation assembly releases the weight of the platform at the resting bar off the ledge, and the kick-out cylinder 64 pushes the resting bar clear of the ledge. Now the lift eye actuation mechanism reverse articulates the platform again through the orientation depicted at FIG. 16 to the deployed position of FIG. 8, and the kick-out cylinder retracts.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An auxiliary vehicle transporter comprising:
   a main frame comprising a left lift rail and a right lift rail, each of said left and right lift rails having a respective lift eye slidably mounted thereto;
   a lift eye actuation mechanism which selectively provides synchronized movement of the lift eye of each of said left and right lift rails therealong;
   a platform having a transport surface and first and second platform ends, said first platform end being pivotally connected to the lift eye of each of said left and right lift rails; and
   left and right pivot arms having first and second arm ends, each said first arm end being pivotally connected to said main frame, each said second arm end being pivotally connected to said platform at a substantially medial location between said first and second platform ends;
   wherein the selective movement of the lift eye of each of said left and right lift rails provides a reverse articulation movement of said platform between a deployed position and a stored position;
   wherein the pivotal connection of said platform to the lift eye of each of said left and right lift rails comprises a pair of platform pivots and wherein said pivotal connection of said first arm ends to said main frame comprises a pair of arm pivots; and
   wherein when said platform is at said deployed position, said pair of platform pivots, said pair of arm pivots, and the second arm end pivot connections to said platform are all located in a common plane.

2. The auxiliary vehicle transporter of claim 1, further comprising:
   a removable connection which provides removable connection of said main frame to a master vehicle having a hitch and vehicular frame members.

3. The auxiliary vehicle transporter of claim 2, wherein said removable connection comprises:
   an insert for being received by the hitch of the master vehicle; and
   a frame connection assembly for removably connecting the main frame to the vehicular frame members of the master vehicle.

4. The auxiliary vehicle transporter of claim 1, further comprising:
   a holding mechanism selectively holding said platform at said stored position; and
   a structural abutment between said platform and said main frame which rests said platform upon said main frame when said platform is at said stored position.

5. The auxiliary vehicle transporter of claim 4, further comprising:
   a removable connection which provides removable connection of said main frame to a master vehicle having a hitch and vehicular frame members.

6. The auxiliary vehicle transporter of claim 5, wherein said removable connection comprises:
   an insert for being received by the hitch of the master vehicle; and
   a frame connection assembly for removably connecting the main frame to the vehicular frame members of the master vehicle.

7. The auxiliary vehicle transporter of claim 6, wherein said frame connection assembly comprises:
   a pair of frame attachment brackets for removably connecting to the vehicular members of the master vehicle;
   a pair of adjustable length inserts, each insert being connected to a respective frame attachment bracket; and
   a pair of attachment bars connected with said main frame, each insert being connected to a respective attachment bar.

8. The auxiliary vehicle transporter of claim 7, wherein each frame attachment bracket comprises:
   a plate bracket;
   an L-shaped bracket; and
   threaded fasteners interconnecting said plate bracket and said L-shaped bracket for providing a selectively tight engirding of a vehicular frame member of the master vehicle by the plate and L-shaped brackets.

9. The auxiliary vehicle transporter of claim 8, wherein said frame connection assembly further comprises:
   a first receiver connected to each L-shaped bracket; and
   a second receiver connected to each said attachment bar;
   wherein a respective said insert is received into the first and second receivers of a respective L-shaped bracket and a respective attachment bar.

10. A master vehicle having an auxiliary vehicle transporter, comprising:

a master vehicle having a hitch and vehicular frame members;

a main frame comprising a left lift rail and a right lift rail, each of said left and right lift rails having a respective lift eye slidably mounted thereto;

a lift eye actuation mechanism which selectively provides synchronized movement of the lift eye of each of said left and right lift rails therealong;

a platform having a transport surface and first and second platform ends, said first platform end being pivotally connected to the lift eye of each of said left and right lift rails;

left and right pivot arms having first and second arm ends, each said first arm end being pivotally connected to said main frame, each said second arm end being pivotally connected to said platform at a substantially medial location between said first and second platform ends; and a removable connection which provides removable connection of said main frame to said standard hitch and said vehicular frame members;

wherein the selective movement of the lift eye of each of said left and right lift rails provides a reverse articulation movement of said platform between a deployed position and a stored position;

wherein said removable connection comprises:
an insert for being received by the hitch of the master vehicle; and
a frame connection assembly for removably connecting the main frame to the vehicular frame members of the master vehicle; and wherein said frame connection assembly comprises:
a pair of frame attachment brackets for removably connecting to the vehicular members of the master vehicle;
a pair of adjustable length inserts, each insert being connected to a respective frame attachment bracket; and
a pair of attachment bars connected with said main frame, each insert being connected to a respective attachment bar.

11. An auxiliary vehicle transporter, comprising:
a main frame;
a platform having a transport surface and first and second platform ends, said first platform end being pivotally connected to said main frame; and
a reverse articulation apparatus connected with said main frame and said platform, said reverse articulation apparatus providing reverse articulation movement of said platform between a deployed position and a stored position;
wherein said reverse articulation apparatus comprises:
a left lift rail and a right lift rail, each of said left and right lift rails having a respective lift eye slidably mounted thereto: and a lift eye actuation mechanism which selectively provides synchronized movement of the lift eve of each of said left and right lift rails therealong; and
left and right pivot arms having first and second arm ends each said first arm end being pivotally connected to said main frame, each said second arm end being pivotally connected to said platform at a substantially medial location between said first and second platform ends;
wherein the pivotal connection of said platform to the lift eye of each of said left and right lift rails comprises a pair of platform pivots, and wherein said pivotal connection of said first arm ends to said main frame comprises a pair of arm pivots;
wherein when said platform is at said deployed position said pair of platform pivots, said pair of arm pivots, and the second arm end pivot connections to said platform are all located in a common plane.

12. The auxiliary vehicle transporter of claim 11, further comprising:
a holding mechanism selectively holding said platform at said stored position; and
a structural abutment between said platform and said main frame which rests said platform upon said main frame when said platform is at said stored position.

13. The auxiliary vehicle transporter of claim 12, further comprising:
a removable connection which provides removable connection of said main frame to a master vehicle having a hitch and vehicular frame members.

14. The auxiliary vehicle transporter of claim 13, wherein said removable connection comprises:
an insert for being received by the hitch of the master vehicle; and
a frame connection assembly for removably connecting the main frame to the vehicular frame members of the master vehicle.

15. The auxiliary vehicle transporter of claim 14, wherein said frame connection assembly comprises:
a pair of frame attachment brackets for removably connecting to the vehicular members of the master vehicle;
a pair of adjustable length inserts, each insert being connected to a respective frame attachment bracket; and
a pair of attachment bars connected with said main frame, each insert being connected to a respective attachment bar.

16. The auxiliary vehicle transporter of claim 15, wherein each frame attachment bracket comprises:
a plate bracket;
an L-shaped bracket; and
threaded fasteners interconnecting said plate bracket and said L-shaped bracket for providing a selectively tight engirding of a vehicular frame member of the master vehicle by the plate and L-shaped brackets.

17. The auxiliary vehicle transporter of claim 16, wherein said frame connection assembly further comprises:
a first receiver connected to each L-shaped bracket; and
a second receiver connected to each said attachment bar;
wherein a respective said insert is received into the first and second receivers of a respective L-shaped bracket and a respective attachment bar.

* * * * *